United States Patent [19]
Bellini

[11] Patent Number: 5,701,276
[45] Date of Patent: Dec. 23, 1997

[54] UNDERWATER COMMUNICATION SYSTEM BY MEANS OF CODED PULSES

[76] Inventor: Pierluigi Bellini, Via Silvagni, 27, Bologna, Italy, 40100

[21] Appl. No.: 629,236

[22] Filed: Apr. 8, 1996

[30] Foreign Application Priority Data

Apr. 11, 1995 [IT] Italy .................. BO95A0160

[51] Int. Cl.$^6$ .................................................. H04B 11/00
[52] U.S. Cl. ..................... 367/133; 367/131; 367/134; 340/850
[58] Field of Search ......................... 367/131, 133, 367/134; 340/850

[56] References Cited

U.S. PATENT DOCUMENTS

| | | | |
|---|---|---|---|
| 3,274,537 | 9/1966 | Toulis | 367/155 |
| 3,732,534 | 5/1973 | Koomey et al. | 367/133 |
| 3,737,857 | 6/1973 | Carman | 340/850 |
| 3,742,440 | 6/1973 | Ehrlich et al. | 367/133 |
| 4,020,449 | 4/1977 | Ito et al. | 367/134 |
| 5,121,366 | 6/1992 | Wayner et al. | 367/134 |

*Primary Examiner*—Ian J. Lobo
*Attorney, Agent, or Firm*—Richard M. Goldberg

[57] ABSTRACT

An underwater communication system by coded pulses, includes a transmitter placed at a surface of a body of water, for transmitting coded pulses, the transmitter having a transmitter circuit for generating the coded pulses, the transmitter circuit including a first shift register pre-programmed with a binary code corresponding to the coded pulses, and an underwater piezoelectric transducer for submersion in the water and electrically connected with the transmitter circuit for transmitting the coded pulses through the water; an underwater receiver for receiving the transmitted coded pulses, without any physical connection between the transmitter and receiver, the receiver having an underwater piezoelectric transducer, submerged in the water, for receiving the transmitted coded pulses, and a receiver circuit for comparing the received code pulses with stored coded pulses, the receiver circuit including an amplifier for amplifying the received coded pulses, an internal clock generator for generating a clock signal, a circuit for synchronizing the received and amplified coded pulses with the generated clock signal, a second shift register pre-programmed with the binary code corresponding to the coded pulses, and a comparator for comparing the received coded pulses with the code pre-programmed into the second memory, to verify that the received coded pulses correspond to the code pre-programmed into the second memory; and an actuator for releasing a submerged object in response to verification by the comparator that the received coded pulses correspond to the code pre-programmed into the second memory.

18 Claims, 4 Drawing Sheets

UNDERWATER COMMUNICATION SYSTEM BY MEANS OF CODED PULSES

BACKGROUND OF THE INVENTION

The present invention relates to an underwater communication system utilizing coded pulses transmitted by an on-surface transmitter connected to a first underwater piezoelectric transducer and which are received by a submerged receiver connected to a second underwater piezoelectric transducer, without any physical connection between the transmitter and the receiver.

There are presently two known ways to transmit a signal through a liquid medium between an object on the surface and an underwater object, namely (i) cable communication and (ii) transmitting sonic or ultrasonic waves that are reflected back to the emitting source.

In the first case, the sending device necessarily has to be wired to the receiving device in order for both devices to be able to transmit and to receive. However, the length of the connecting cable and the problems of setting the cable, limit the use of this method to short distance communication, since the devices are connected together.

In the second case, there is no connection such as a wire between the transmitter and the receiver. Rather, a pulse is transmitted through the liquid, reflected without any change by the receiver and received by the transmitter itself. This is the principle on which echo sounders are based, and can only work if there are no reflecting objects between the transmitter and the receiver. Moreover, it is not possible to establish a two way connection, since the submerged body behaves only as a reflector and cannot send self-created signals. Thus, an echo sounder only measures the distance of the reflecting object.

OBJECTS AND SUMMARY OF THE INVENTION

Accordingly, it is an object of the present invention to provide an underwater communication system that overcomes the problems with the aforementioned prior art.

It is another object of the present invention to provide an underwater communication system that allows a two way wireless communication by means of coded pulses between two devices, with one device being on the surface and the other submerged, or both being submerged in a liquid, such as a sea, lake, river, etc.

It is still another object of the present invention to provide an underwater communication system in which a uni-directional communication can be made bi-directional by modifying the circuits of the two transmitting-receiving devices.

The above objects are achieved by an underwater communication system in which a transmittent source of pulses is placed at the surface of the water and is connected to an underwater piezoelectric transducer submerged just below the surface of the water. A receiver is positioned in the water, for example, on the seabed, and receives the pulses transmitted by the transmitter, through another underwater piezoelectric transducer to which the receiver is connected.

The underwater communication system can be made uni-directional or bi-directional, that is, the communication between the two devices may be one of only transmitting, only receiving or both transmitting and receiving. Such communication is carried out with the transmission from the transmitter to the receiver of sonic or ultrasonic pulses, at the characteristic frequency of the transducer that is used.

The transmitter generates a signal with a suitable frequency and pulse width, for example, a frequency pulse of 200 KHz during an on or transmission period of 200 microseconds (μsec), and with an interval between consecutive pulses of 20 milliseconds (msec). However, the values of the frequency (KHz), pulse duration (μsec) and interval (msec) can be any suitable values, with their values varying in dependence on the specific application. For example, there can be a frequency pulse of 200 KHz during an on or transmission period of 320 microseconds (μsec), with an interval between consecutive pulses of 20.48 milliseconds (msec). In such case, the total period is 20.8 msec, that is, 20.48 msec plus 320 μsec. As another example, there can be a frequency pulse of 120 KHz during an on or transmission period of 70 microseconds (μsec), with an interval between consecutive pulses of 7.5 milliseconds (msec).

The pulses generated by the transmitter are sent through a shift register which is pre-programmed with the selected key or code, to the underwater piezoelectric transducer. Preferably, the preset code is a binary type code, where "1" represents a pulse and "0" represents the absence of a pulse, with the code including any number of bits. Thus, the transmitter sends coded pulses.

The receiver includes an underwater transducer similar to the transducer in the transmitter. The pulses sent by the transmitter are received and amplified in the receiver. The receiver includes an oscillator which generates a time interval clock signal with the same period as the transmitted signal, for example, 20 msec. Upon reception of the first pulse, the receiver synchronizes its clock with that of the received signal. The subsequent pulses, which include data, are regenerated and widened for better reliability, and supplied to the DATA input of a serial in, parallel out (SIPO) shift register which has been pre-programmed with the same key or code of the transmitter. The generated clock is also supplied to the CLOCK input of the shift register. At this time, an "open gate" condition exists.

When the preset code is received at the shift register, a pulse is generated, which can be used for any of different purposes. For example, in a preferred embodiment, this pulse controls an actuator of a mechanical device, and is also used for synchronization for the reception of subsequent information that can be characters, numbers, controls, etc. In this manner, an exchange of information has been achieved between the transmitter and receiver, using the water as a means of conduction of this exchange.

In accordance with an aspect of the present invention, an underwater communication system by means of coded pulses, includes transmitter means, placed at a surface of a body of water, for transmitting coded pulses; and underwater receiver means for receiving the transmitted coded pulses, without any physical connection between the transmitter means and receiver means.

The transmitter means includes a transmitter circuit for generating the coded pulses; and an underwater piezoelectric transducer for submersion in the water and electrically connected with the transmitter circuit for transmitting the coded pulses to the receiver. Preferably, the coded pulses are transmitted at a resonance frequency of the transducer.

The transmitter circuit includes a shift register pre-programmed with a code corresponding to the coded pulses. Preferably, the code is a binary code, and the coded pulses are transmitted as ultrasonic pulses.

The receiver means includes an underwater piezoelectric transducer, submerged in the water, for receiving the transmitted coded pulses; and a receiver circuit for comparing the received code pulses with stored coded pulses. The receiver circuit includes amplifier means for amplifying the received coded pulses, an internal clock generator for generating a clock signal, means for synchronizing the received and amplified coded pulses with the generated clock signal, and a shift register pre-programmed with a code corresponding to the received code pulses, and comparator means for comparing the received and amplified coded pulses with the code pre-programmed into the shift register, to verify that the received coded pulses correspond to the code pre-programmed into the shift register.

In accordance with another aspect of the present invention, an underwater communication system by means of coded pulses, includes transmitter means, placed at a surface of a body of water, for transmitting coded pulses, the transmitter means having a transmitter circuit for generating the coded pulses, the transmitter circuit including first memory means pre-programmed with a code corresponding to the coded pulses, and an underwater piezoelectric transducer for submersion in the water and electrically connected with the transmitter circuit for transmitting the coded pulses through the water; and underwater receiver means for receiving the transmitted coded pulses, without any physical connection between the transmitter means and receiver means, the receiver means including an underwater piezoelectric transducer, submerged in the water, for receiving the transmitted coded pulses, and a receiver circuit for comparing the received code pulses with stored coded pulses, the receiver circuit including second memory means pre-programmed with the code corresponding to the coded pulses, and comparator means for comparing the received coded pulses with the code pre-programmed into the second memory means, to verify that the received coded pulses correspond to the code pre-programmed into the second memory means.

In accordance with still another aspect of the present invention, an underwater communication system by means of coded pulses, includes transmitter means, placed at a surface of a body of water, for transmitting coded pulses, the transmitter means including a transmitter circuit for generating the coded pulses, the transmitter circuit including first memory means pre-programmed with a binary code corresponding to the coded pulses, and an underwater piezoelectric transducer for submersion in the water and electrically connected with the transmitter circuit for transmitting the coded pulses through the water; underwater receiver means for receiving the transmitted coded pulses, without any physical connection between the transmitter means and receiver means, the receiver means including an underwater piezoelectric transducer, submerged in the water, for receiving the transmitted coded pulses, and a receiver circuit for comparing the received code pulses with stored coded pulses, the receiver circuit including amplifier means for amplifying the received coded pulses, an internal clock generator for generating a clock signal, means for synchronizing the received and amplified coded pulses with the generated clock signal, second memory means pre-programmed with the binary code corresponding to the coded pulses, and comparator means for comparing the received coded pulses with the code pre-programmed into the second memory means, to verify that the received coded pulses correspond to the code pre-programmed into the second memory means; and actuator means for releasing a submerged object in response to verification by the comparator means that the received coded pulses correspond to the code pre-programmed into the second memory means.

The above and other objects, features and advantages of the invention will become readily apparent from the following detailed description thereof which is to be read in connection with the accompanying drawings.

DETAILED DESCRIPTION OF THE PREFERRED EMBODIMENTS

Figure 1A:
FIG. 1a is a graphical diagram showing a clock signal CK.
Figure 1B:
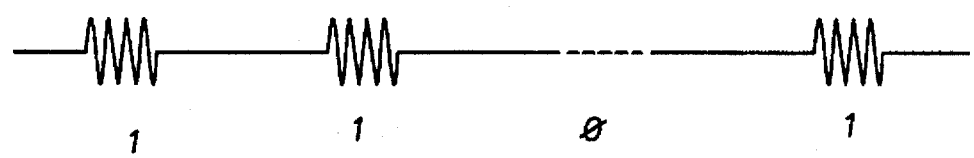
FIG. 1b is a graphical diagram showing a sample coded pulse signal corresponding to the clock signal CK of FIG. 1a, and which is transmitted.
Figure 1C:
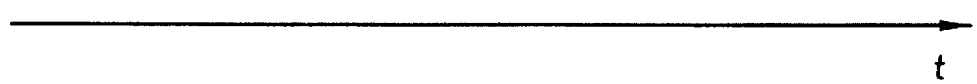
FIG. 1c is a time line for the signals of FIGS. 1a and 1b.
Figure 2A:
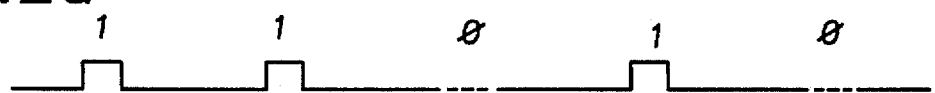
FIG. 2a is a graphical diagram showing the received pulses, as amplified.
Figure 2B:
FIG. 2b is a graphical diagram showing the pulses of FIG. 2a, widened from about 320 μsec to more than 15 msec, to make them more suitable for a DATA input of an SIPO shift register.
Figure 2C:
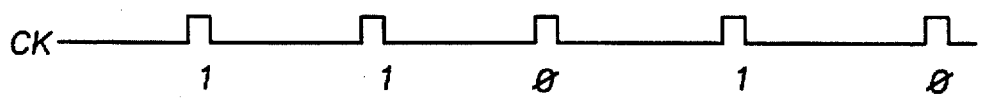
FIG. 2c is a graphical diagram showing the generated clock signal in the receiver.
Figure 3:
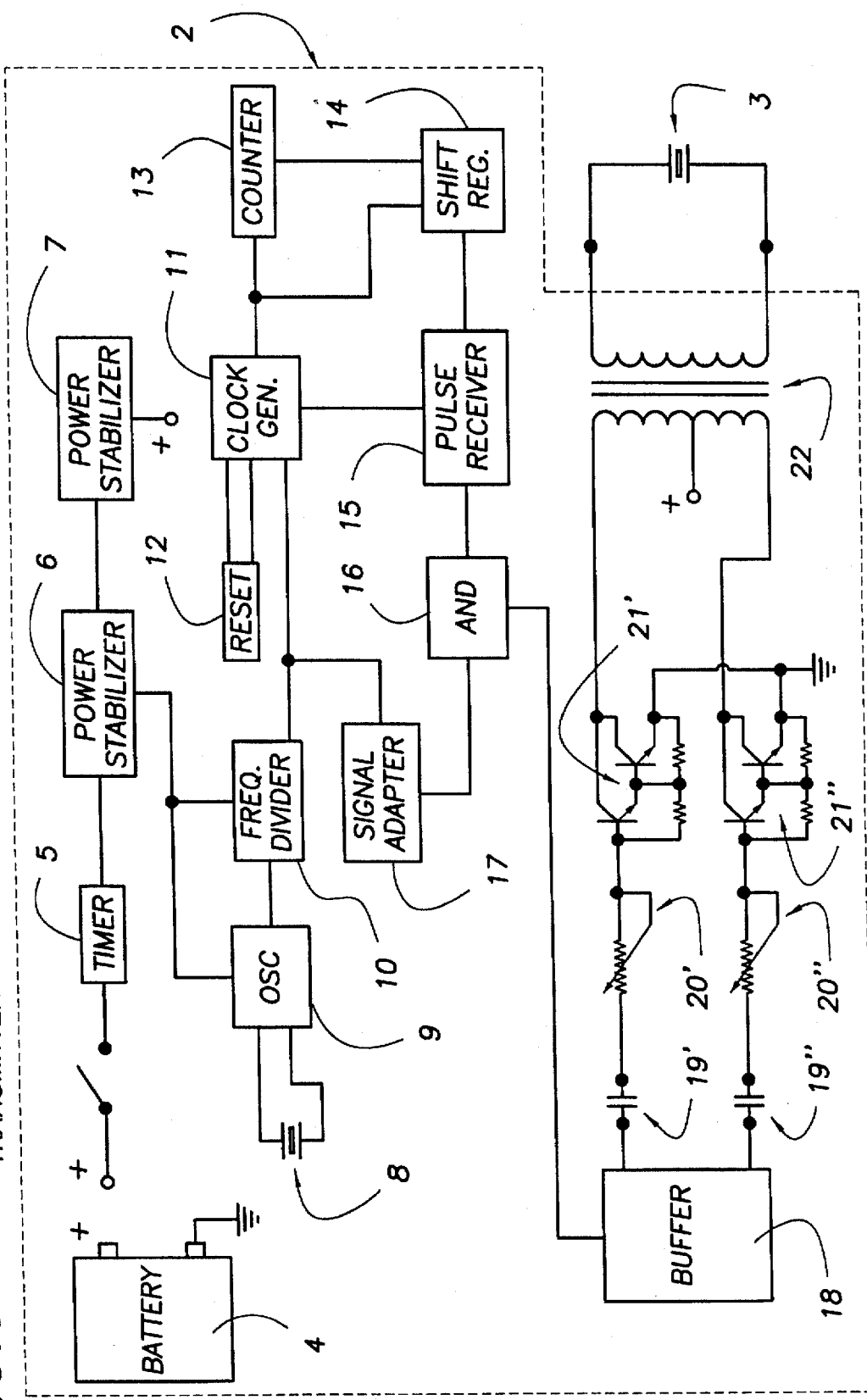
FIG. 3 is a block diagram of the transmitter according to the present invention.
Figure 4:
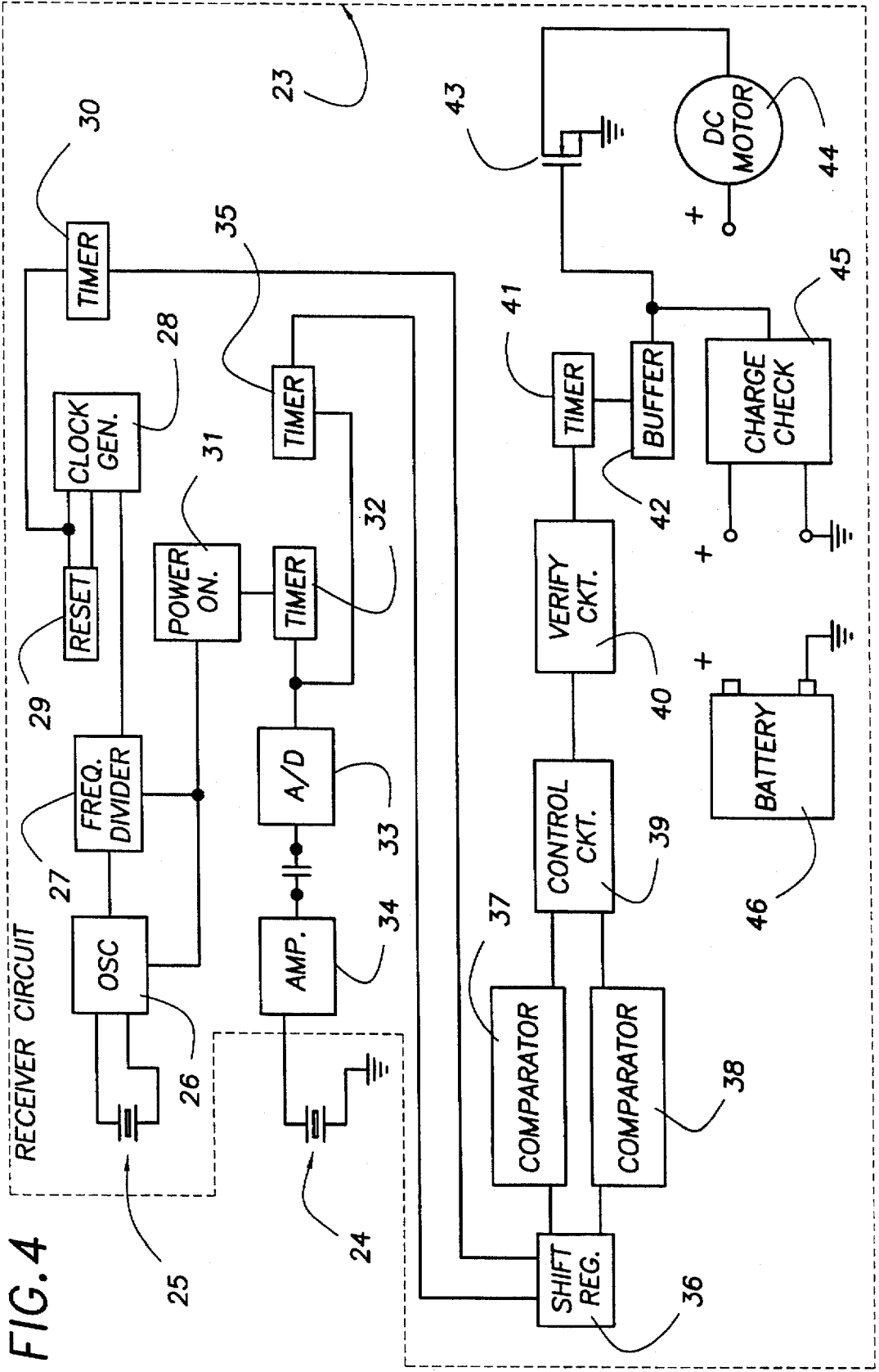
FIG. 4 is a block diagram of the receiver according to the present invention.
Figure 5A:
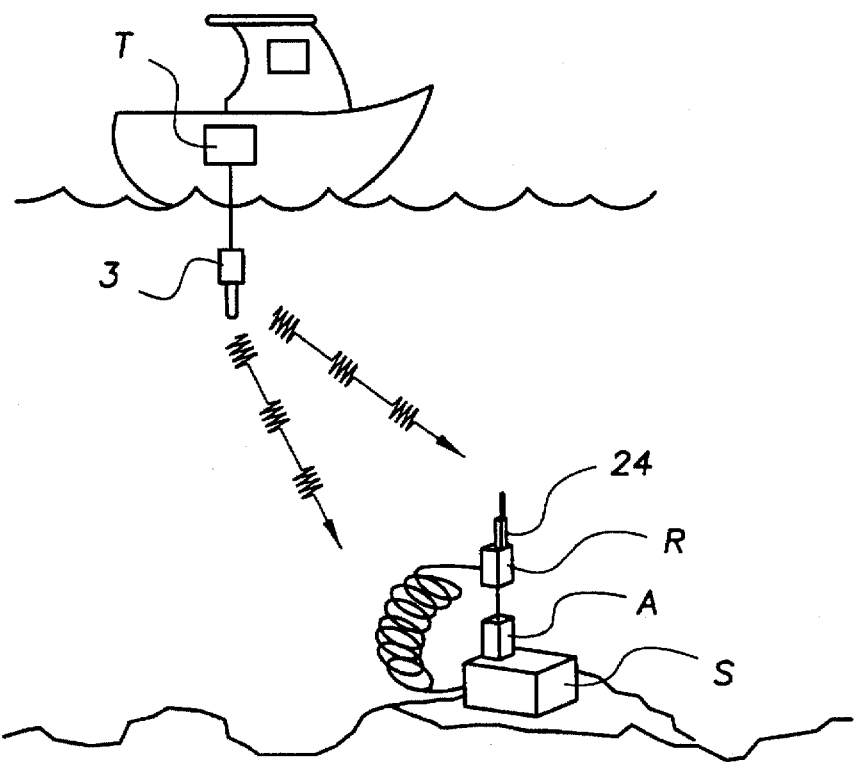
FIG. 5a is a schematic diagram showing a transmitter placed on a surface craft and a receiver held in place by an actuator on an object on the seabed.
Figure 5B:
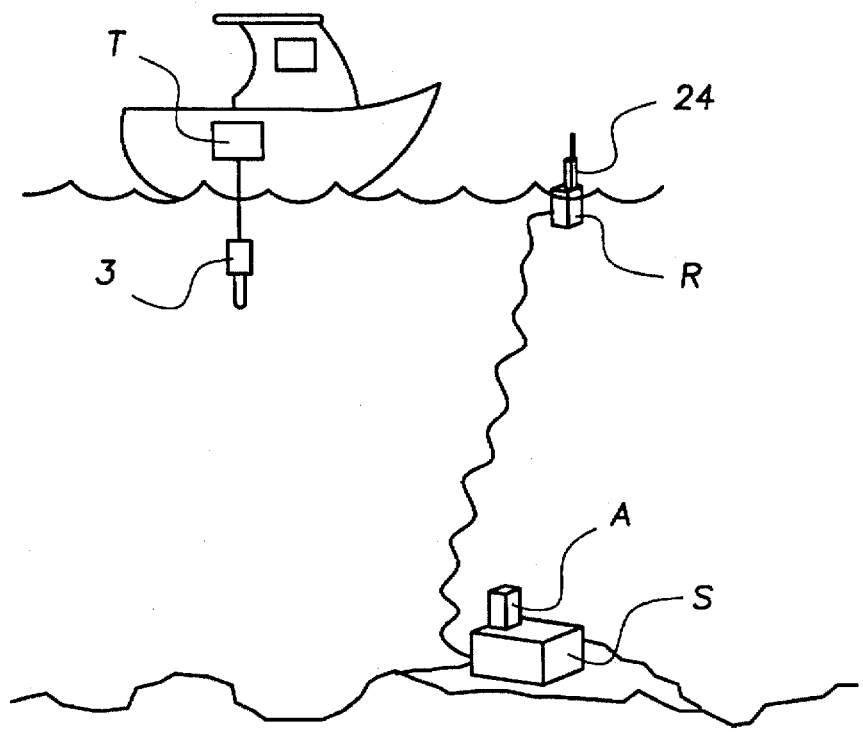
FIG. 5b is a schematic diagram similar to FIG. 5a, but with the receiver being released by the actuator and having floated to the water surface.

Referring to the drawings in detail, the underwater communication system according to the present invention includes a transmitter T, as shown in FIGS. 5a and 5b, within a seagoing craft, such as a boat. As shown in FIG. 3, transmitter T is comprised essentially of a transmitter circuit 2, and a conventional 200 KHz underwater ultrasonic transducer 3 connected to circuit 2 and positioned just below the surface of the water.

Circuit 2 includes a 12 volt DC battery supply 4 that is formed as part of transducer T or as part of the craft's battery supply, a timer 5 which powers circuit 2 for a few seconds, and two power stabilizers 6 and 7 that respectively power other 8 volt and 12 volt components of circuit 2.

Circuit 2 further includes a 2 MHz quartz crystal 8, and a quartz oscillator 9 which is powered by stabilizer 6 at 8 volts and which is connected to an output of quartz crystal 8 to produce an oscillation signal with a frequency of 2 MHz. A frequency divider 10, which is also powered by stabilizer 6, frequency divides the 2 MHz output from oscillator 9 to a 200 KHz signal, that is, by a factor of ten.

An internal clock generator 11 is supplied with the 200 KHz signal from frequency divider 10 and produces a 320 μsec pulse signal with a 20.48 msec pulse signal as an interval or period between the 320 μsec pulses, in response to the 200 KHz signal. A reset 12 is connected with an input of internal clock generator 11, and has a logical AND function. Basically, internal clock generator 11 is a binary counter that generates the respective pulse times. When the counter reaches a desired value, reset 12 operates to reset clock generator 11 and restart the count. For example, when the total period is 20.8 msec, that is, 20.48 msec plus 320 μsec, reset 12 resets clock generator 11 every 20.8 msec.

As an example, clock generator 11 can be a CMOS 4020B counter and reset 12 can be a CMOS 4081B AND gate. In such case, a 200 KHz signal is supplied to the clock input at pin 10. Pin 2 produces a count 4096 (Q13) supplied to input A of the AND gate, while pin 6 produces a count 64 (Q7) at the input B of the AND gate. Specifically, a positive pulse is output from pin 2 when counter Q13 is at a logic level "1" state and stays at this logic level "1" state for 320 μsec, at the same time that the output from pin 6 (corresponding to counter Q7) is at a logic level "1" state. At this time, the output of the AND gate at pin 11 is used as the reset, and restarts the counter from zero.

Internal clock generator 11 sends the pulse signals as clock pulses to a clock counter 13. Clock counter 13 counts the clock pulses and when a predetermined count, for example, eight clock pulses, has been counted, supplies a control signal to a parallel in, serial out (PISO) shift register or converter 14 for the parallel loading of a preset code which is stored in shift register 14, with shift register 14 outputting the preset code in a serial manner in accordance with the clock pulses from clock generator 11. The preset code is pre-programmed with a selected key. Preferably, the preset code is a binary type code, where "1" represents a pulse and "0" represents the absence of a pulse, with the code being made from any number of bits, such as the eight bit 01001111 binary code (2F hexadecimal). For example, each pulse of the preset code has a duration of 320 μsec, with an interval between pulses of 20.48 msec.

A pulse receiver 15 receives the coded pulses of the preset code from shift register 14 and sends these pulses, with a timing determined by the clock pulses from clock generator 11, to one input of an AND gate 16. A signal adapter 17 supplies the 200 KHz signal from frequency divider 10 to another input of AND gate 16, and also converts the 8 volts at the output of frequency divider 10, to 12 volts and supplies 12 volt power to AND gate 16. AND gate 16 performs an AND operation between the 200 KHz signal and the 320 μsec pulse signal, and produces two signals with a phase shift of 180° therebetween, each with a frequency of 200 KHz for 320 μsec.

A buffer circuit 18 amplifies the signals, and sends the amplified signals to two power Darlington BD×53 transistor pairs 21', 21" through a series circuit of two capacitors 19', 19" and two trimmer resistors 20', 20", respectively.

The outputs of power Darlington transistor pairs 21', 21" are connected to opposite ends of the primary coil of a transformer 22, a center tap of which is supplied with 12 volts from stabilizer 7. Darlington transistor pairs 21', 21" work with a phase shift of 180° to create a sinewave-like waveform from two inverted square waves with a phase shift of 180°, on the primary of transformer 22. In this regard, transistor pair 21' sends a saturation pulse to the transformer (top down). When the pulse from transistor pair 21' is ended, transistor pair 21" sends a desaturation pulse (bottom up), so that the secondary of transformer 22 sees a single sine wave with a tension (peak to peak) value which is twice that of the original signal.

As a result, there is a voltage of 24 volts across the primary coil of transformer 22. The secondary coil of transformer 22, in turn, provides a voltage of 300 volts, such that transformer 22 increases the voltage from 24 volts to 300 volts.

Accordingly, a 309 volt signal having a frequency of 200 KHz during pulse durations of 320 μsec of a preset code, with an interval or period between pulses of 20.48, msec is supplied to ultrasonic transducer 3, which transmits the coded pulse signal to a receiver R.

In a preferred embodiment, receiver R is connected to a release actuator A for the recovery of a submerged object S, as shown in FIGS. 5a and 5b. Receiver R includes a receiver circuit 23 and an underwater transducer 24.

Circuit 23 includes a 2 MHz quartz crystal 25, and a quartz oscillator 26 which is connected to an output of quartz crystal 25 to produce an oscillation signal. A frequency divider 27 frequency divides the 2 MHz output from oscillator 26 to a 200 KHz signal, that is, by a factor of ten.

An internal clock generator 28 is supplied with the 200 KHz signal from frequency divider 27 and produces a 320 μsec pulse signal with an interval or period between pulses of 20.48 msec, in response thereto. A reset 29 is connected with an input of internal clock generator 28, and has a logical AND function. Basically, internal clock generator 28 is a binary counter that generates the respective pulse times. When the counter reaches a desired value, reset 29 operates to reset clock generator 28 and restart the count. For example, when the total period is 20.8 msec, that is, 20.48 msec plus 320 μsec, reset 29 resets clock generator 28 every 20.8 msec.

A monostable multivibrator or one-shot timer 30 receives each 320 μsec pulse from clock generator 28, and produces a 2 msec signal in response thereto.

An amplifier 34 amplifies the signal received from transducer 24, and supplies the amplified signal through a capacitor to an integrated circuit of a signal digitizer 33, that is, an analog to digital converter. A second monostable multivibrator or one-shot timer 32 receives the digitized signal from circuit 33 and, through an integrated circuit 31, powers oscillator 26 and frequency divider 27 for a period of 2 seconds upon receipt of the first pulse of the received signal. In this regard, the clock signal that is generated by receiver R is synchronized with the received signal.

The output of digitizer circuit 33 is also supplied to a third monostable multivibrator or one-shot timer 35 that receives the 320 μsec pulse signal and widens it to 18 msec.

A serial in, parallel out (SIPO) shift register 36 which is pre-programmed with the same key or code as shift register 14 of transmitter T, receives the 18 msec pulse signal from monostable multivibrator 35 and the 2 msec clock pulse signal from monostable multivibrator 30, and in response thereto, produces the received code. In other words, when both signals are received by shift register 36, an "open gate" condition occurs.

As a result, the received code is supplied by shift register 36, along with the preset code, to two integrated circuits or comparators 37 and 38 in order to match the received code with the preset code. The reason that two comparators 37 are used is that each comparator 37 and 38 is a commercial 4 bit comparator, while shift register 36 produces an 8 bit signal. Therefore, it is necessary to use two comparators to decode the 8 bits.

An integrated control circuit 39 generates a control pulse if the code verified by circuits 37 and 38 is correct, that is, is the preset code. If the preset code is correct, a signal indicating the same, that is, a "code is OK" signal, is supplied to an integrated verifying circuit 40. To avoid any errors, circuit 40 verifies several times that the "code is OK" signal has been sent by circuit 39, and sends a signal acknowledging the same to a monostable multivibrator or one-shot timer 41. Monostable multivibrator 41 generates a pulse of sufficient length to operate a DC motor 44 that controls actuator A of FIGS. 5a and 5b to release underwater transducer 24 and allow receiver R to float to the surface of the water. A buffer 42 is connected between monostable multivibrator 41 and DC motor 44 to prevent DC motor 44 from being operated more than once for each sequence of received pulses.

DC motor 44 includes a built-in rpm divider and is powered by a battery 46 through a MOSFET 43. An integrated charge checking circuit 45 checks the charge of battery 46, and sends a forced release control to ensure that receiver R is released to the surface when the charge of battery 46 is too low.

Although the above embodiment has been described in regard to a device to pilot a release, the invention can be applied to other uses. For example, the same receiver can translate the received signal to displayed pulses, so as to provide visual information or coded characters to a scuba diver, keeping him in touch with the craft that has the transmitter. At the same time, the scuba diver can transmit a coded pulse signal to the craft to provide bidirectional wireless communication.

Further, although a binary code is transmitted, ASCII characters or other commands can be sent by adding appropriate circuits. In such case, the receiver will recognize and display the characters received after the key or perform appropriate actions. This latter arrangement is very useful as a means of ship to ship, or ship to submarine underwater communication.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. An underwater communication system by means of coded pulses, comprising:

transmitter means, placed at a surface of a body of water, for transmitting digitized, single frequency, coded pulses as ultrasonic signals with bits of the coded pulses separated by a predetermined pause and the coded pulses including a proprietary key, said key being characterized by three parameters as follows:
   (a) a single preset frequency,
   (b) a preset time between two consecutive bits, and
   (c) a digital numeric code; and underwater receiver means for receiving the transmitted coded pulses, without any physical connection between the transmitter means and receiver means and which performs a function in response to said coded pulses when said proprietary key is properly identified.

2. An underwater communication system according to claim 1, wherein said transmitter means includes:

a transmitter circuit for generating said coded pulses; and an underwater piezoelectric transducer for submersion in the water and electrically connected with said transmitter circuit for transmitting said coded pulses to the receiver.

3. An underwater communication system according to claim 2, wherein said coded pulses are transmitted at a resonance frequency of said transducer.

4. An underwater communication system according to claim 2, wherein said transmitter circuit includes a shift register pre-programmed with a code corresponding to said coded pulses.

5. An underwater communication system according to claim 4, wherein said code stored in said shift register is a binary code.

6. An underwater communication system according to claim 1, wherein said receiver means includes:

an underwater piezoelectric transducer, submerged in said water, for receiving said transmitted coded pulses; and a receiver circuit for comparing said received code pulses with stored coded pulses.

7. An underwater communication system according to claim 6, wherein said receiver circuit includes:

amplifier means for amplifying said received coded pulses; and an internal clock generator for generating a clock signal;

means for synchronizing the received and amplified coded pulses with the generated clock signal;

a shift register pre-programmed with a code corresponding to said received code pulses; and comparator means for comparing the received and amplified coded pulses with said code pre-programmed into said shift register, to verify that said received coded pulses correspond to the code pre-programmed into said shift register.

8. An underwater communication system according to claim 1, wherein said digital numeric code is an 8-bit code.

9. An underwater communication system according to claim 1, wherein each of said transmitter means and said receiver means includes only one transceiver for both transmitting and receiving said coded pulses.

10. An underwater communication system according to claim 9, wherein each said transceiver includes only one transducer for transmitting and receiving said coded pulses.

11. An underwater communication system according to claim 1, wherein said transmitter means includes only one transducer for transmitting said coded pulses and said receiver means includes only one transducer for receiving said coded pulses.

12. An underwater communication system by means of coded pulses, comprising:

transmitter means, placed at a surface of a body of water, for transmitting digitized, single frequency, coded pulses as ultrasonic signals with bits of the coded pulses separated by a predetermined pause and the coded pulses including a proprietary key, said key being characterized by three parameters as follows:
   (a) a single preset frequency,
   (b) a preset time between two consecutive bits, and
   (c) a digital numeric code, said transmitter means including:

a transmitter circuit for generating said coded pulses, said transmitter circuit including first memory means pre-programmed with a code corresponding to said coded pulses, and an underwater piezoelectric transducer for submersion in the water and electrically connected with said transmitter circuit for transmitting said coded pulses through said water; and underwater receiver means for receiving the transmitted coded pulses, without any physical connection between the transmitter means and receiver means, and which performs a function in response to said coded pulses when said proprietary key is properly identified, said receiver means including:

an underwater piezoelectric transducer, submerged in said water, for receiving said transmitted coded pulses, and a receiver circuit for comparing said received code pulses with stored coded pulses, said receiver circuit including:

second memory means pre-programmed with said code corresponding to said coded pulses, and comparator means for comparing the received coded pulses with said code pre-programmed into said second memory means, to verify that said received coded pulses correspond to the code pre-programmed into said second memory means.

13. An underwater communication system according to claim 12, wherein said first memory means includes a shift register pre-programmed with said code corresponding to said coded pulses.

14. An underwater communication system according to claim 13, wherein said code stored in said shift register is a binary code.

15. An underwater communication system according to claim 12, wherein said receiver circuit further includes:
   amplifier means for amplifying said received coded pulses;
   an internal clock generator for generating a clock signal; and
   means for synchronizing the received and amplified coded pulses with the generated clock signal.

16. An underwater communication system according claim 15, wherein said second memory means includes a shift register pre-programmed with said code corresponding to said received code pulses.

17. An underwater communication system according to claim 12, further comprising actuator means for releasing a submerged object in response to verification by said comparator means that said received coded pulses correspond to the code pre-programmed into said second memory means.

18. An underwater communication system by means of coded pulses, comprising:
   transmitter means, placed at a surface of a body of water, for transmitting digitized, single frequency, coded pulses as ultrasonic signals with bits of the coded pulses separated by a predetermined pause and the coded pulses including a proprietary key, said key being characterized by three parameters as follows:
   (a) a single preset frequency,
   (b) a preset time between two consecutive bits, and
   (c) a digital numeric code,
   said transmitter means including:
      a transmitter circuit for generating said coded pulses, said transmitter circuit including first memory means pre-programmed with a binary code corresponding to said coded pulses, and
      an underwater piezoelectric transducer for submersion in the water and electrically connected with said transmitter circuit for transmitting said coded pulses through said water;
   underwater receiver means for receiving the transmitted coded pulses, without any physical connection between the transmitter means and receiver means, and which performs a function in response to said coded pulses when said proprietary key is properly identified, said receiver means including:
      an underwater piezoelectric transducer, submerged in said water, for receiving said transmitted coded pulses, and
      a receiver circuit for comparing said received code pulses with stored coded pulses, said receiver circuit including:
         amplifier means for amplifying said received coded pulses,
         an internal clock generator for generating a clock signal,
         means for synchronizing the received and amplified coded pulses with the generated clock signal,
         second memory means pre-programmed with said binary code corresponding to said coded pulses, and
         comparator means for comparing the received coded pulses with said code pre-programmed into said second memory means, to verify that said received coded pulses correspond to the code pre-programmed into said second memory means; and
   actuator means for releasing a submerged object in response to verification by said comparator means that said received coded pulses correspond to the code pre-programmed into said second memory means.

* * * * *